(12) United States Patent
Tsuchiya

(10) Patent No.: US 12,528,746 B2
(45) Date of Patent: Jan. 20, 2026

(54) PILLAR-SHAPED HONEYCOMB STRUCTURE AND METHOD FOR MANUFACTURING SAME

(71) Applicant: NGK INSULATORS, LTD., Nagoya (JP)

(72) Inventor: Yusuke Tsuchiya, Kuwana (JP)

(73) Assignee: NGK INSULATORS, LTD., Nagoya (JP)

( * ) Notice: Subject to any disclaimer, the term of this patent is extended or adjusted under 35 U.S.C. 154(b) by 94 days.

(21) Appl. No.: 18/598,155

(22) Filed: Mar. 7, 2024

(65) Prior Publication Data
US 2024/0327303 A1 Oct. 3, 2024

(30) Foreign Application Priority Data

Mar. 30, 2023 (JP) .................................. 2023-056776

(51) Int. Cl.
*C04B 38/00* (2006.01)
*B01D 46/00* (2022.01)
(Continued)

(52) U.S. Cl.
CPC ...... *C04B 38/0009* (2013.01); *B01D 46/0001* (2013.01); *B01D 46/24491* (2021.08); *B01D 46/24492* (2021.08); *B01D 53/94* (2013.01); *B01J 35/57* (2024.01); *C04B 35/10* (2013.01); *C04B 38/0012* (2013.01); *B01D 2255/9155* (2013.01); *B01D 2259/455* (2013.01); *B01D 2279/30* (2013.01); *B28B 2003/203* (2013.01);
(Continued)

(58) Field of Classification Search
None
See application file for complete search history.

(56) References Cited

U.S. PATENT DOCUMENTS

2013/0145735 A1 6/2013 Motoki et al.
2016/0272547 A1* 9/2016 Kikuchi ................ C04B 35/117

FOREIGN PATENT DOCUMENTS

JP 2016-175810 A 10/2016
WO 2013/047908 A1 4/2013

OTHER PUBLICATIONS

Japanese Office Action (with English translation) dated Nov. 20, 2025 (Application No. 2023-056776).

* cited by examiner

*Primary Examiner* — Elizabeth Collister
(74) *Attorney, Agent, or Firm* — BURR PATENT LAW, PLLC

(57) ABSTRACT

A pillar-shaped honeycomb structure, comprising an outer peripheral side wall; first cells having an opening on the first end surface and having a sealing portion on the second end surface; and second cells adjacent to the first cells with partition walls interposed therebetween and having a sealing portion on the first end surface and having an opening on the second end surface; wherein the outer peripheral side wall, the partition walls, and the sealing portions are fired, and comprise cordierite as a main component and one or more sintering aids selected from ceria, zirconia, and titania; wherein in the partition walls, assuming an average porosity of a portion in a range A, and a portion in a range B is $P_1$ (%); and assuming an average porosity of a portion in a range C is $P_2$ (%), $-4 \leq P_1 - P_2 \leq 7$ is satisfied.

9 Claims, 5 Drawing Sheets

(51) Int. Cl.
    *B01D 46/24*           (2006.01)
    *B01D 53/94*           (2006.01)
    *B01J 35/57*            (2024.01)
    *B28B 3/20*             (2006.01)
    *C04B 35/10*           (2006.01)

(52) U.S. Cl.
    CPC .............. *C04B 2235/3217* (2013.01); *C04B 2235/3229* (2013.01); *C04B 2235/3232* (2013.01); *C04B 2235/3244* (2013.01)

PILLAR-SHAPED HONEYCOMB STRUCTURE AND METHOD FOR MANUFACTURING SAME

CROSS REFERENCE TO RELATED APPLICATIONS

The present invention claims the benefit of priority to Japanese Patent Application No. 2023-56776 filed on Mar. 30, 2023 with the Japanese Patent Office, the entire contents of which are incorporated herein by reference in its entirety.

FIELD OF THE INVENTION

The present invention is related to a pillar-shaped honeycomb structure and a method for manufacturing the same.

BACKGROUND OF THE INVENTION

Exhaust gas emitted from internal combustion engines such as diesel engines contains large amounts of particulate matter whose main component is carbon, which causes environmental pollution. For this reason, the exhaust system of a diesel engine or the like is generally equipped with a filter (Diesel Particulate Filter: DPF) for collecting particulates. Furthermore, in recent years, particulates emitted from gasoline engines have become a problem, and gasoline engines are also being equipped with filters (Gasoline Particulate Filters: GPFs).

As a filter, there is known a wall flow type pillar-shaped honeycomb structure, comprising an outer peripheral side wall; a plurality of first cells disposed on the inner peripheral side of the outer peripheral side wall, extending from a first end surface to a second end surface, opening on the first end surface and having sealing portions on the second end surface; and a plurality of second cells disposed on the inner peripheral side of the outer peripheral side wall, extending from the first end surface to the second end surface, having sealing portions on the first end surface, and opening on the second end surface; wherein the first cells and the second cells are arranged alternately adjacent to each other with partition walls interposed therebetween.

Patent Literature 1 describes an invention that aims to provide a honeycomb filter that can suppress an increase in pressure loss, have a large maximum amount of soot deposited, and achieve high durability. The honeycomb filter comprises a tubular honeycomb structure having porous partition walls partitioning a plurality of cells extending from one end surface to the other end surface serving as flow paths of a fluid; and sealing portions disposed at one open end of certain of the cells and the other open end of the remaining cells; characterized in that a porosity of the partition walls is 46% or less, a permeability of the honeycomb structure is 0.8 µm² or more, and a pore volume ratio of pores with a pore diameter of 40 µm or more is 7.5% or less, and further, a pore volume ratio of pores with a pore diameter of 10 µm or less is 25% or less, and a coefficient of thermal expansion of the honeycomb structure from 40° C. to 800° C. is $1.0 \times 10^{-6}$/° C. or less.

In addition, Patent Literature 1 describes the partition walls are made of a porous material whose main component is cordierite; the partition walls contain at least one selected from the group consisting of cerium oxide, zirconium oxide, and yttrium oxide in the partition walls; the content ratio of cerium oxide is 3.0% by mass or less; the content ratio of zirconium oxide is 2.5% by mass or less; and the content ratio of yttrium oxide is 2.0% by mass or less. Patent Literature 1 describes that, with this configuration, it is possible to suppress the formation of pores that are not related to gas permeability, and to produce a honeycomb structure with low porosity while maintaining the permeability. It is also described that when the porosity of the honeycomb structure is lowered, the heat capacity of the honeycomb filter increases, so the durability of the honeycomb filter becomes higher and the maximum amount of soot deposited can be improved.

PRIOR ART

Patent Literature

[Patent Literature 1] WO 2013/047908

SUMMARY OF THE INVENTION

As described in Patent Literature 1, adding a small amount of ceria (cerium oxide) or the like to a honeycomb filter whose main component is cordierite is advantageous in suppressing the formation of pores that are not related to gas permeability and producing a honeycomb structure with low porosity while maintaining the permeability. However, the honeycomb filter described in Patent Literature 1 does not have sufficient strength because the sealing portions are not fired, and the sealing portions are easily damaged by ash or the like during use. Furthermore, if strong pressure is applied, there is a risk that the sealing portions may fall off.

On the other hand, even if the sealing portions are fired, it has been found that a honeycomb filter made of cordierite as a main component with addition of sintering aids such as cerium oxide have a problem in that sufficient mechanical strength cannot be obtained. For this reason, it has been difficult to employ a high porosity in a honeycomb filter to which a sintering aid such as cerium oxide is added.

The present invention has been created in view of the above circumstances, and in one embodiment, an object of the present invention is to suppress a decrease in mechanical strength of a pillar-shaped honeycomb structure containing a sintering aid and having cordierite as a main component. Further, in another embodiment, an object of the present invention is to provide a method for manufacturing a pillar-shaped honeycomb structure with improved mechanical strength.

The inventor of the present invention made extensive studies to solve the above problems, and has found that during firing, the sintering aid moves from the partition walls to the sealing portions, causing a local increase in the porosity of the partition walls in the vicinity of the sealing portions, resulting in a decrease in strength. The sintering aid gathers on small pore side due to capillary action and closes the small pore, but at the same time it also moves to the sealing material. In addition, it has been also found that since the sintering aid has the effect of blocking the pores, more pore-forming material is used than usual to maintain the porosity, and the partition walls where the sintering aid has been removed have a higher porosity.

As a result of discovering such a phenomenon, the present inventor has come to believe that suppressing the movement of the sintering aid from the partition walls to the sealing portions and suppressing the increase in the porosity of the partition walls in the vicinity of the sealing parts portions help to suppress the decrease in mechanical strength, and has found that it is effective to add a sintering aid to the sealing portions as well. The present invention has been completed based on the findings, and is exemplified as below.

Aspect 1

A pillar-shaped honeycomb structure, comprising an outer peripheral side wall; a plurality of first cells disposed on an inner peripheral side of the outer peripheral side wall, each extending from a first end surface to a second end surface, having an opening on the first end surface and having a sealing portion on the second end surface; and a plurality of second cells disposed on the inner peripheral side of the outer peripheral side wall, each extending from the first end surface to the second end surface, having a sealing portion on the first end surface, and having an opening on the second end surface; the first cells and the second cells being arranged alternately adjacent to each other with partition walls interposed therebetween;
- wherein the outer peripheral side wall, the partition walls, and the sealing portions are fired, and comprise cordierite as a main component and one or more sintering aids selected from ceria, zirconia, and titania;
- wherein in the partition walls, assuming an average porosity of a portion in a range A from a deepest part of the sealing portions of the second end surface in the direction in which the first cells extend to the second end surface, and a portion in a range B from a deepest part of the sealing portions of the first end surface in the direction in which the second cells extend to the first end surface is $P_1$ (%); and
- in the partition walls, assuming an average porosity of a portion in a range C from the deepest part of the sealing portions of the second end surface in the direction in which the first cells extend to the deepest part of the sealing portions of the first end surface in the direction in which the second cells extend is $P_2$ (%), $-4 \leq P_1 - P_2 \leq 7$ is satisfied.

Aspect 2

The pillar-shaped honeycomb structure according to aspect 1, wherein $-2 \leq P_1 - P_2 \leq 5$ is satisfied.

Aspect 3

The pillar-shaped honeycomb structure according to aspect 1 or 2, wherein $55 \leq P_2 \leq 70$ is satisfied.

Aspect 4

The pillar-shaped honeycomb structure according to any one of aspects 1 to 3, wherein in the partition walls, assuming an average value of a total content ratio of the one or more sintering aids selected from ceria, zirconia, and titania in the portion in the range A and the portion in the range B is $S_1$ (%), and in the partition walls, assuming an average value of a total content ratio of the one or more sintering aids selected from ceria, zirconia, and titania in the range C is $S_2$ (%), and assuming a cumulative 50% pore diameter of the partition walls in a volume-based cumulative pore diameter distribution measured by a mercury porosimetry is D50 (μm), $(S_2-S_1)/D50 \times 100 \leq 6$ is satisfied.

Aspect 5

The pillar-shaped honeycomb structure according to any one of aspects 1 to 4, wherein in the partition walls of the portion in the range C, a cumulative 10% pore diameter (D10), a cumulative 50% pore diameter (D50), and a cumulative 90% pore diameter (D90) from the small pore side in a volume-based cumulative pore diameter distribution measured by a mercury porosimetry satisfy a relationship (D90–D10)/D50≤1.2.

Aspect 6

A method for manufacturing a pillar-shaped honeycomb structure, the pillar-shaped honeycomb structure comprising an outer peripheral side wall; a plurality of first cells disposed on an inner peripheral side of the outer peripheral side wall, each extending from a first end surface to a second end surface, having an opening on the first end surface and having an sealing portion on the second end surface; and a plurality of second cells disposed on the inner peripheral side of the outer peripheral side wall, each extending from the first end surface to the second end surface, having a sealing portion on the first end surface, and having an opening on the second end surface; the first cells and the second cells being arranged alternately adjacent to each other with partition walls interposed therebetween; the method comprising:
- kneading a raw material composition containing a cordierite-forming raw material, a dispersion medium, a pore-forming material, a binder, and further containing one or more sintering aids selected from ceria, zirconia, and titania to form a green body, and then extrusion molding the green body to obtain a pillar-shaped honeycomb formed body comprising an outer peripheral side wall; and a plurality of cells disposed on an inner peripheral side of the outer peripheral side wall, each extending from the first end surface to the second end surface and having an opening on both the first end surface and the second end surface;
- drying the pillar-shaped honeycomb formed body, and then filling the openings on the first end surface and the second end surface where the sealing portions are to be formed with a slurry for forming the sealing portions, the slurry for forming the sealing portions containing a cordierite-forming raw material, a dispersion medium, a pore-forming material, a binder, and further containing one or more sintering aids selected from ceria, zirconia, and titania; and
- firing the pillar-shaped honeycomb formed body filled with the slurry for forming the sealing portions;
- wherein for the sintering aid in the raw material composition, assuming a total added amount with respect to 100 parts by mass of the cordierite-forming raw material is $C_1$ parts by mass, and for the sintering aid in the slurry for forming the sealing portions, assuming a total added amount with respect to 100 parts by mass of the cordierite-forming raw material is $C_2$ parts by mass, $-8 \leq C_1 - C_2 \leq 1$ is satisfied.

Aspect 7

The method according to aspect 6, wherein $-6 \leq C_1 - C_2 \leq 0$ is satisfied.

Aspect 8

The method according to aspect 6 or 7, wherein $1 \leq C_2 \leq 10$ is satisfied.

Aspect 9

The method according to any one of aspects 6 to 8, wherein both the sintering aid in the raw material composition and the sintering aid in the slurry for forming the sealing portions have a median diameter (D50) in a volume-based cumulative particle diameter distribution determined by a laser diffraction/scattering method of 0.1 to 10 μm.

According to one embodiment of the present invention, it is possible to suppress a decrease in mechanical strength of a pillar-shaped honeycomb structure that contains a sintering aid such as ceria and whose main component is cordierite. As a result, for example, even if the porosity of the partition walls is increased in order to achieve even lower pressure loss, it is possible to ensure the mechanical strength required as a product. Furthermore, by adding a sintering aid such as ceria, the pore diameter distribution can be sharpened, in other words, pores with highly uniform pore diameter can be obtained. A sharp pore diameter distribution is considered to be advantageous in improving the balance between low pressure loss and collection performance.

DETAILED DESCRIPTION OF THE INVENTION

Hereinafter, embodiments of the present invention will now be described in detail with reference to the drawings. It should be understood that the present invention is not intended to be limited to the following embodiments, and any change, improvement or the like of the design may be appropriately added based on ordinary knowledge of those skilled in the art without departing from the spirit of the present invention.

(1. Pillar-Shaped Honeycomb Structure)

Figure 1:
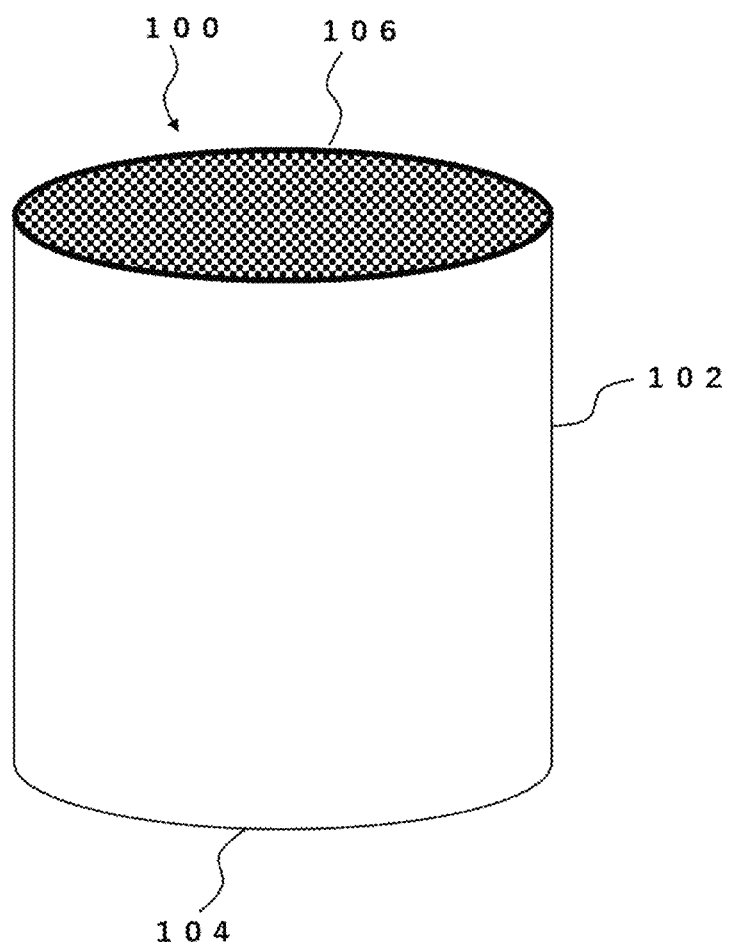
FIG. 1 is a perspective view schematically showing a wall flow type pillar-shaped honeycomb structure.
Figure 2:
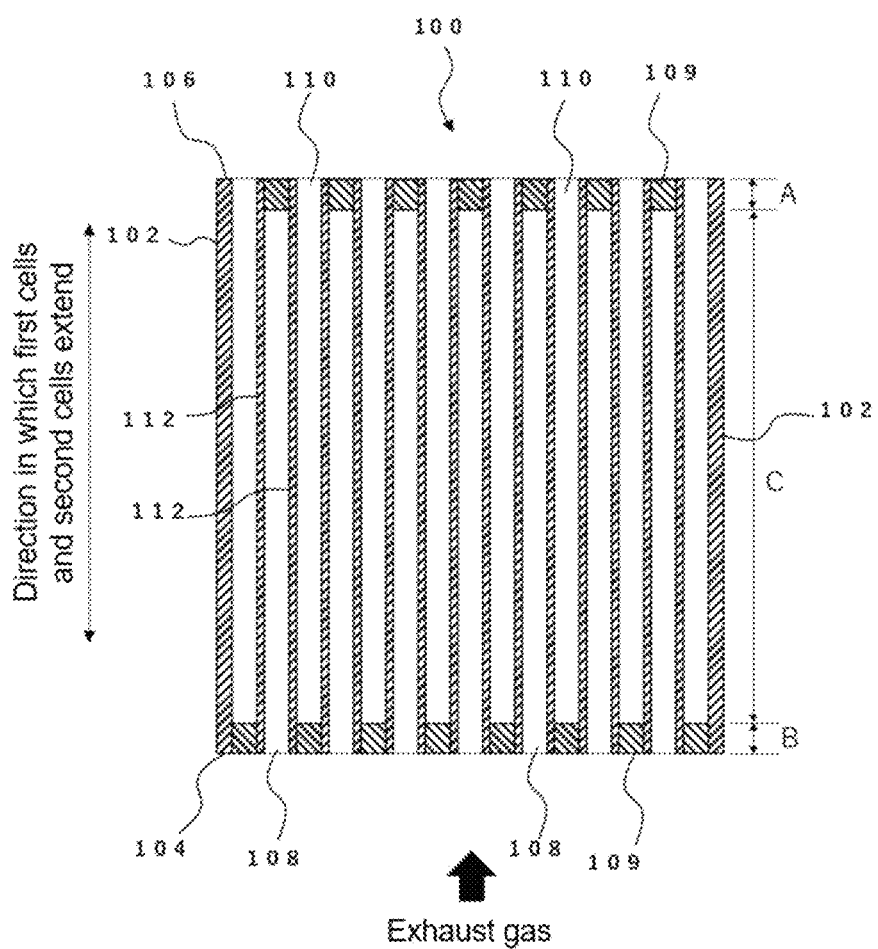
FIG. 2 is a schematic cross-sectional view of a wall-flow type pillar-shaped honeycomb structure as viewed from a cross-section parallel to the direction in which the cells extend.

FIGS. 1 and 2 respectively illustrate a schematic perspective view and a cross-sectional view of a pillar-shaped honeycomb structure 100 that can be used as a wall-flow type automobile exhaust gas filter and/or a catalyst carrier. This pillar-shaped honeycomb structure 100 comprises an outer peripheral side wall 102; a plurality of first cells 108 disposed on the inner peripheral side of the outer peripheral side wall 102, each extending from a first end surface 104 to a second end surface 106, having an opening on the first end surface 104 and having a sealing portion 109 on the second end surface 106; and a plurality of second cells 110 disposed on the inner peripheral side of the outer peripheral side wall 102, each extending from the first end surface 104 to the second end surface 106, having a sealing portion 109 on the first end surface 104, and having an opening on the second end surface 106. In this pillar-shaped honeycomb structure 100, the first cells 108 and the second cells 110 are alternately arranged adjacent to each other with partition walls 112 interposed therebetween.

For example, when exhaust gas containing particulate matter such as soot is supplied to the first end surface 104 on the upstream side of the pillar-shaped honeycomb structure 100, the exhaust gas is introduced into the first cells 108 and proceeds downstream inside the first cells 108. Since the first cells 108 on the downstream side at the second end surface 106 are sealed, the exhaust gas passes through the porous partition walls 112 that partitions the first cells 108 and the second cells 110 and flows into the second cells 110. Since the particulate matter cannot pass through the partition walls 112, it is collected and deposited within the first cells 108. After the particulate matter has been removed, the clean exhaust gas that has entered the second cells 110 proceeds downstream within the second cells 110 and exits from the second end surface 106 on the downstream side.

There is no limit to the shape of the end surfaces of the pillar-shaped honeycomb structure 100, but for example, they can be round shapes such as a circular shape, an elliptical shape, a racetrack shape and a long-circle shape; a polygonal shape such as a triangular shape and a quadrangular shape; and other irregular shapes. The illustrated pillar-shaped honeycomb structure 100 has circular end surfaces and is a cylindrical shape as a whole.

The height of the pillar-shaped honeycomb structure (the length from the first end surface to the second end surface) is not particularly limited and may be set as appropriate depending on the use and required performance. The height of the pillar-shaped honeycomb structure can be, for example, 40 mm to 450 mm. There is also no particular restriction on the relationship between the height of the pillar-shaped honeycomb structure and the maximum diameter of each end surface (referring to the maximum length of line segments passing through the center of gravity of each end surface of the pillar-shaped honeycomb structure). Therefore, the height of the pillar-shaped honeycomb structure may be longer than the maximum diameter of each end surface, or the height of the pillar-shaped honeycomb structure may be shorter than the maximum diameter of each end surface.

The outer peripheral side wall, the partition walls, and the sealing portions of the pillar-shaped honeycomb structure are fired, and each contains cordierite as a main component. This means that the total mass proportion of cordierite ($2MgO \cdot 2Al_2O_3 \cdot 5SiO_2$) in 100 mass % of the materials constituting the outer peripheral side wall, the partition walls, and the sealing portions is 50 mass % or more. The mass proportion of cordierite in 100 mass % of the material constituting the outer peripheral side wall, the partition walls, and the sealing portions is preferably 70 mass % or more, and more preferably 80 mass % or more. The mass percentage of cordierite is measured by X-ray diffraction (XRD) method.

From the viewpoint of sharpening the pore diameter distribution, it is preferable that each of the outer peripheral side walls and partition walls of the pillar-shaped honeycomb structure contains one or more sintering aids selected from ceria, zirconia, and titania, and it is more preferable to contain at least ceria. Further, from the viewpoint of suppressing a decrease in mechanical strength, the sealing portions of the pillar-shaped honeycomb structure preferably contain one or more sintering aids selected from ceria, zirconia, and titania, and more preferably contain at least ceria.

In the case where the partition walls contain one or more sintering aids selected from ceria, zirconia, and titania, in order to suppress the decrease in the mechanical strength of the pillar-shaped honeycomb structure, it is desirable that the difference between the porosity (%) of the partition walls in the vicinity of the sealing portions and the porosity (%) of the partition walls in portions away from the sealing portions is small. Specifically, it is preferable to satisfy $P_1-P_2 \leq 7$, more preferable to satisfy $P_1-P_2 \leq 5$, and even more preferable to satisfy $P_1-P_2 \leq 4$. When the upper limit of $P_1-P_2$ is 7 or less, there is an advantage that a decrease in the mechanical strength of the pillar-shaped honeycomb structure is suppressed. However, if $P_1-P_2$ is too small, it may have the disadvantage of reducing the mechanical strength of the honeycomb structure due to the difference in rigidity, so it is preferable to satisfy $-4 \leq P_1-P_2$, and more preferable to satisfy $-2 \leq P_1-P_2$, and even more preferable to satisfy $0 \leq P_1-P_2$. Therefore, for example, it is preferable to satisfy $-4 \leq P_1-P_2 \leq 7$, more preferable to satisfy $-2 \leq P_1-P_2 \leq 5$, and even more preferable to satisfy $0 \leq P_1-P_2 \leq 3$.

In the partition walls 112, $P_1$ refers to an average porosity (%) of a portion in a range A from the deepest part of the sealing portions 109 of the second end surface 106 in the direction in which the first cells 108 extend to the second end surface 106, and a portion in a range B from the deepest part of the sealing portions 109 of the first end surface 104 in the direction in which the second cells 110 extend to the first end surface 104.

In the partition walls 112, $P_2$ refers to an average porosity of a portion in a range C from the deepest part of the sealing portions 109 of the second end surface 106 in the direction in which the first cells 108 extend to the deepest part of the sealing portions 109 of the first end surface 104 in the direction in which the second cells 110 extend.

From the viewpoint of achieving low pressure loss, $P_2$ preferably satisfies $55 \leq P_2$, more preferably satisfies $57 \leq P_2$, and even more preferably satisfies $59 \leq P_2$. In addition, from the viewpoint of ensuring mechanical strength, $P_2$ preferably satisfies $P_2 \leq 70$, more preferably satisfies $P_2 \leq 68$, and even more preferably satisfies $P_2 \leq 66$. Therefore, for example, it is preferable to satisfy $55 \leq P_2 \leq 70$, more preferably to satisfy $57 \leq P_2 \leq 68$, and even more preferably to satisfy $59 \leq P_2 \leq 66$.

$P_1$ and $P_2$ are measured by the following procedure. First, the procedure for measuring $P_2$ will be explained. Three samples of the partition walls (cross-sectional size (20 mm length×2 mm width)×0.3 mm depth) with an exposed cross-section parallel to the direction in which the cells extend are uniformly collected from the portions of the partition walls in the above range C. Next, the cross-section of each sample is observed with an X-ray microscope and CT scanned, and the obtained three-dimensional cross-sectional image is binarized based on brightness, and divided into a large number of voxels (size of one voxel=a cube with length in wall surface direction of partition wall (Y direction): 0.8 µm; length in thickness direction of partition wall (X direction): 0.8 µm; and length in depth direction of partition wall (Z direction): 0.8 µm) with spatial portions and solid portions.

The measurement conditions for the X-ray microscope are 4× magnification.

Binarization processing is performed using Otsu's binarization method.

Figure 3:
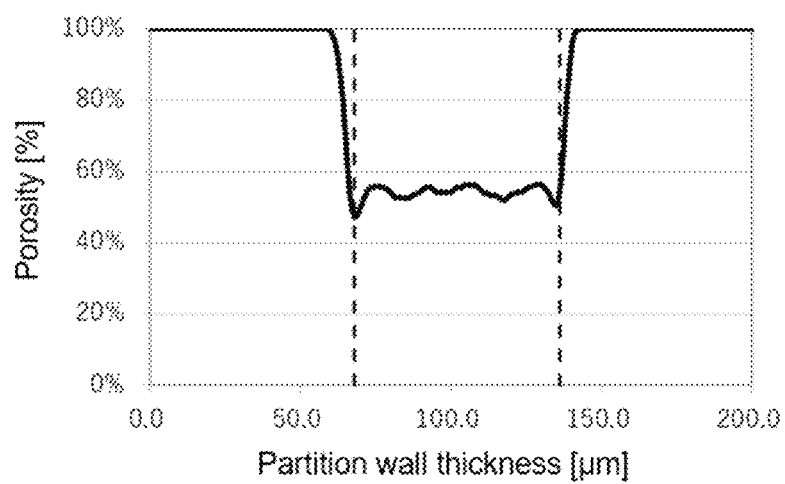
FIG. 3 is an example of a porosity profile when the porosity (%) is measured along the thickness direction D of the partition walls from one surface to the other surface.

Next, for a predetermined region (length in wall surface direction of partition wall (Y direction): 340 µm, length in thickness direction of partition wall (X direction): a length that encompasses the entire thickness and has space of 50 µm or more on both sides of the partition wall; length in depth direction of partition wall (Z direction): 300 µm) of any one partition wall on the three-dimensional cross-sectional image, based on the binarized voxel data, a profile of porosity (%) is obtained every 0.8 µm along the thickness direction of the partition wall (X direction) from one surface to the other surface (see FIG. 3). The porosity for a thickness of 0.8 µm is calculated for a region of 0.8 µm thickness (length in wall surface direction of partition wall (Y direction): 340 µm; length in thickness direction of partition wall (X direction): 0.8 µm; length in depth direction of partition wall (Z direction): 300 µm) according to the formula: porosity=(number of voxels of spatial portions)/(total number of voxels in the region)×100(%). By performing the calculation for the entire predetermined region at 0.8 µm intervals from the left edge of the screen, a profile of porosity (%) is obtained at intervals of 0.8 µm along the thickness direction of the partition wall (X direction) from one surface to the other surface.

Figure 4:
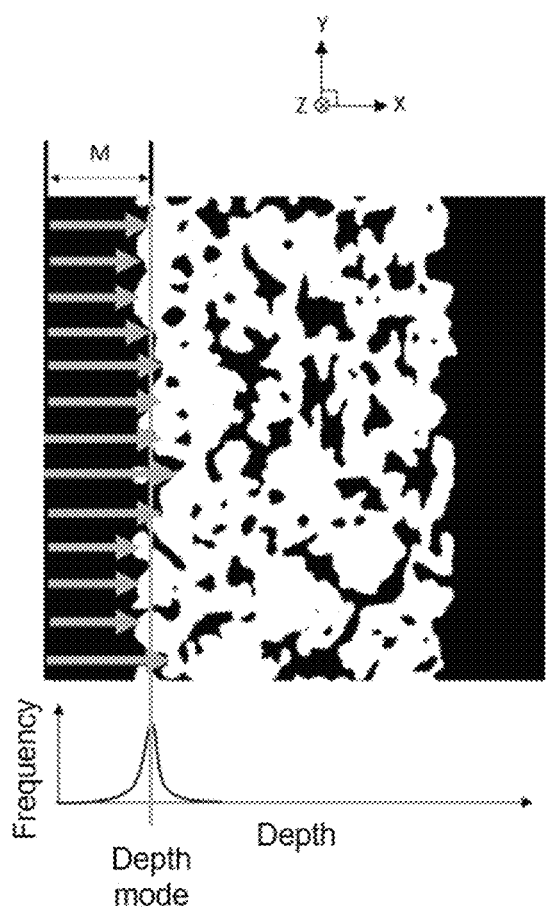
FIG. 4 is a conceptual diagram illustrating a method for specifying the position of one surface of a partition wall on a cross-sectional image.

At this time, the position of one surface of the partition wall is defined as the position of the mode when measuring the distance M in the thickness direction D (X direction) from a line parallel to the wall surface direction of the partition wall to the one surface of the partition wall to be measured, as shown in FIG. 4. The distance M is measured at intervals of 0.8 µm over a length of 340 µm in the wall surface direction of the partition wall (Y direction perpendicular to the thickness direction (X direction)) on the binarized image. The position of the other surface of the partition wall is specified in the same manner.

In this way, the porosity profile of any one partition wall is obtained from each sample, and the average porosity of the partition wall is determined from the profile. Then, the average value of the total of three partition wall samples in the range C is defined as the average porosity $P_2$ (%).

Next, the procedure for measuring $P_1$ will be explained. Three samples of the partition walls (cross-sectional size (20 mm length×2 mm width)×0.3 mm depth) with an exposed cross-section parallel to the direction in which the cells extend are uniformly collected from the portions of the partition walls in the above range A and the above range B respectively, resulting in a total of six samples. Next, the cross-section of each sample is observed with an X-ray microscope and CT scanned using the same method as the measurement of $P_2$, and the obtained three-dimensional cross-sectional image is binarized based on brightness, and divided into a large number of voxels with spatial portions and solid portions.

Figure 5:
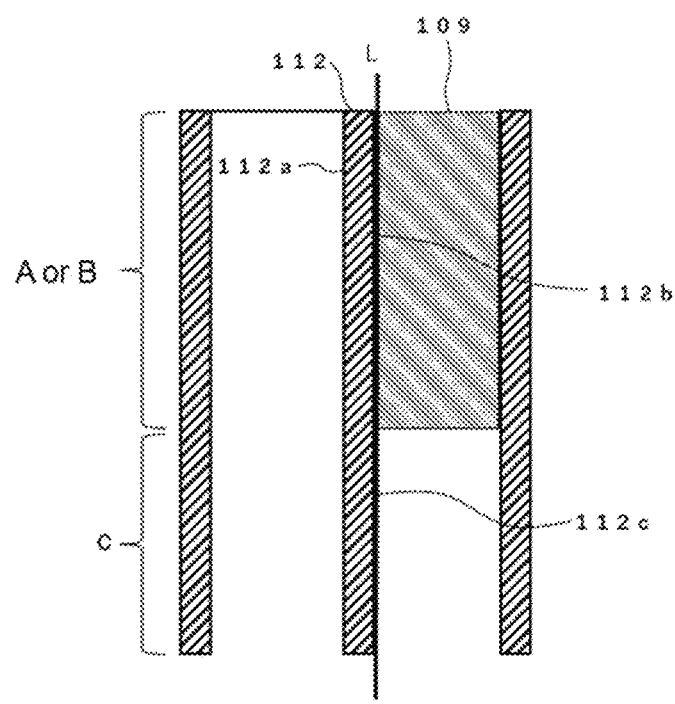
FIG. 5 is a schematic partial enlarged view of the vicinity of the sealing portion when the partition walls of the pillar-shaped honeycomb structure are observed in a cross-section parallel to the direction in which the cells extend.

Next, for a predetermined region (length in wall surface direction of partition wall (Y direction): 340 µm, length in thickness direction of partition wall (X direction): a length that encompasses the entire thickness and has space of 50 µm or more on both sides of the partition wall; length in depth direction of partition wall (Z direction): 300 µm) of any one partition wall on the three-dimensional cross-sectional image, based on the binarized voxel data, a profile of porosity (%) is obtained every 0.8 µm along the thickness direction of the partition wall (X direction) from one surface to the other surface, using the same method as the measurement of $P_2$. However, in the partition wall in the range A and the range B, one surface 112*a* is adjacent to the cell space, while the other surface 112*b* is adjacent to the sealing portion 109. It is difficult to specify the boundary between the sealing portion 109 and the partition wall 112. Therefore, the position of the surface 112*c* of the partition wall in the range C where the sealing portion 109 of the other surface 112b of the partition wall 112 are not adjacent is specified by the method described above, and a straight line L along the surface 112c is drawn to define the boundary with the sealing portion. FIG. 5 shows a schematic partial enlarged view of the vicinity of the sealing portion when the partition walls of the pillar-shaped honeycomb structure are observed in a cross-section parallel to the direction in which the cells extend.

In this way, the porosity profile of any one partition wall is obtained from each sample, and the average porosity of the partition wall is determined from the profile. Then, the average value of the total of six partition wall samples in the range A and the range B is defined as the average porosity $P_1$ (%).

In a pillar-shaped honeycomb structure mainly composed of cordierite and containing the above-mentioned sintering aid, in order to suppress the decrease in mechanical strength, it is advantageous to suppress the movement of the sintering aid from the partition walls to the sealing portions, and to suppress a local decrease in porosity of the partition walls in the vicinity of the sealing portions. The movement of the sintering aid is thought to be due to the difference in the concentration of the sintering aid between the sealing portions and the partition walls, so this can be suppressed by adding the same sintering aid to the sealing portions to the similar extent as to the partition walls, preferably in a larger amount than to the partition walls. This concentration difference is preferably set appropriately according to the cumulative 50% pore diameter (D50) of the partition walls, which will be described later.

Specifically, it is preferable that the average value $S_1$ (%) of the total content ratio of one or more sintering aids selected from ceria, zirconia, and titania of the partition walls in the vicinity of the sealing portions, the average value $S_2$ (%) of the total content ratio of the sintering aid of the partition walls in portions away from the sealing portions, and the cumulative 50% pore diameter (D50) (μm) of the partition walls, satisfy the following relationship. Specifically, it is preferable to satisfy $(S_2-S_1)/D50 \times 100 \leq 6$, more preferably to satisfy $(S_2-S_1)/D50 \times 100 \leq 4$, and even more preferable to satisfy $(S_2-S_1)/D50 \times 100 \leq 2$. When the upper limit of $(S_2-S_1)/D50 \times 100$ is 6 or less, there is an advantage that reduction in mechanical strength of the pillar-shaped honeycomb structure is suppressed. The lower limit of $(S_2-S_1)/D50 \times 100$ is not set in particular, but if it is too small, the effect of suppressing mechanical strength decline will be saturated, and considering the range of $S_2$, which is shown later, it is normal to satisfy $-6 \leq (S_2-S_1)/D50 \times 100$, typical to satisfy $-4 \leq (S_2-S_1)/D50 \times 100$, more typical to satisfy $-2 \leq (S_2-S_1)/D50 \times 100$. Therefore, for example, it is preferable to satisfy $-6 \leq (S_2-S_1)/D50 \times 100 \leq 6$, more preferable to satisfy $-4 \leq (S_2-S_1)/D50 \times 100 \leq 4$, and even more preferable to satisfy $-2 \leq (S_2-S_1)/D50 \times 100 \leq 2$.

In the partition walls 112, $S_1$ refers to the average value (%) of the total content of one or more sintering aids selected from ceria, zirconia, and titania in the portion in the range A from the deepest part of the sealing portions 109 of the second end surface 106 in the direction in which the first cells 108 extend to the second end surface 106, and the portion in the range B from the deepest part of the sealing portions 109 of the first end surface 104 in the direction in which the second cells 110 extend to the first end surface 104. In the partition walls 112, $S_2$ refers to the average value (%) of the total content of one or more sintering aids selected from ceria, zirconia, and titania in the portion in the range C from the deepest part of the sealing portions 109 of the second end surface 106 in the direction in which the first cells 108 extend to the deepest part of the sealing portions 109 of the first end surface 104 in the direction in which the second cells 110 extend.

From the viewpoint of sharpening the pore diameter distribution, it is preferable to satisfy $1 \leq S_2$, more preferable to satisfy $2 \leq S_2$, and even more preferable to satisfy $3 \leq S_2$. Further, from the viewpoint of suppressing a decrease in the melting point of the partition walls, it is preferable to satisfy $S_2 \leq 10$, more preferable to satisfy $S_2 \leq 8$, and even more preferable to satisfy $S_2 \leq 6$. Therefore, for example, it is preferable to satisfy $1 \leq S_2 \leq 10$, more preferable to satisfy $2 \leq S_2 \leq 8$, and even more preferable to satisfy $3 \leq S_2 \leq 6$.

In addition, from the viewpoint of suppressing the movement of the sintering aid from the partition walls to the sealing portions, the sealing portions of the pillar-shaped honeycomb structure preferably contain one or more sintering aids selected from ceria, zirconia, and titania, and more preferably contain at least ceria. Assuming the average value of the total content of one or more sintering aids selected from ceria, zirconia, and titania in the sealing portions is $S_3$ (%), from the viewpoint of suppressing the movement of the sintering aid from the partition walls to the sealing portions, it is preferable to satisfy $1 \leq S_3$, more preferable to satisfy $2 \leq S_3$, and even more preferable to satisfy $3 \leq S_3$. Further, from the viewpoint of suppressing a decrease in the melting point of the sealing portions, it is preferable to satisfy $S_3 \leq 10$, more preferable to satisfy $S_3 \leq 8$, and even more preferable to satisfy $S_3 \leq 6$. Therefore, for example, it is preferable to satisfy $1 \leq S_3 \leq 10$, more preferable to satisfy $2 \leq S_3 \leq 8$, and even more preferable to satisfy $3 \leq S_3 \leq 6$.

The total content of sintering aids is measured by an energy dispersive X-ray spectrometer (EDS) equipped with a scanning electron microscope (SEM). Specifically, samples (size: 15 mm×15 mm×15 mm) in which a cross-section parallel to the direction in which the cells extend is exposed is taken from the measurement locations of the outer peripheral side wall, the partition wall, and sealing portions, and the cross-section is mirror-polished using diamond slurry, and the polished surface is used as an observation sample. This polished surface was observed by SEM-EDS analysis at 200 magnification (size of one field: 700 μm×700 μm) and elemental mapping was performed. Assuming that the area of the solid portions excluding the spatial portions on the SEM image is 100%, the area occupied by Ce is determined by image analysis, and this is regarded as the content of ceria. Similarly, assuming that the area of the solid portions excluding the spatial portions on the SEM image is 100%, the area occupied by Zr is determined by image analysis, and this is regarded as the content of zirconia. Assuming that the area of the solid portions excluding the spatial portions on the image is 100%, the area occupied by Ti is determined by image analysis, and this is regarded as the content of titania.

The method for measuring $S_1$ will be explained. Using the method described above, two samples of the partition wall in which the cross-section parallel to the direction in which the cells extend is exposed are collected without bias from the portions of the partition wall in the above range A and range B respectively (a total of four samples), and an observation sample is prepared for each. Each observation sample is elementally mapped by the SEM-EDS analysis described above, and the total content of one or more sintering aids selected from ceria, zirconia, and titania is determined. Then, the average value of the total content in all the observation samples is defined as $S_1$ (%).

The method for measuring $S_2$ will be explained. Using the method described above, two samples of the partition wall in which the cross-section parallel to the direction in which the cells extend is exposed are collected without bias from the portions of the partition wall in the above range C, and an observation sample is prepared for each. Each observation sample is elementally mapped by the SEM-EDS analysis described above, and the total content of one or more sintering aids selected from ceria, zirconia, and titania is determined. Then, the average value of the total content in all the observation samples is defined as $S_2$ (%).

The method for measuring $S_3$ will be explained. Using the method described above, two samples of the partition wall in which the cross-section parallel to the direction in which the cells extend is exposed are collected without bias from the vicinity of the first end surface and the second end surface respectively (a total of four samples), and an observation sample is prepared for each. Each observation sample is elementally mapped by the SEM-EDS analysis described above, and the total content of one or more sintering aids selected from ceria, zirconia, and titania is determined. Then, the average value of the total content in all observation samples is defined as $S_3$ (%).

Figure 6:
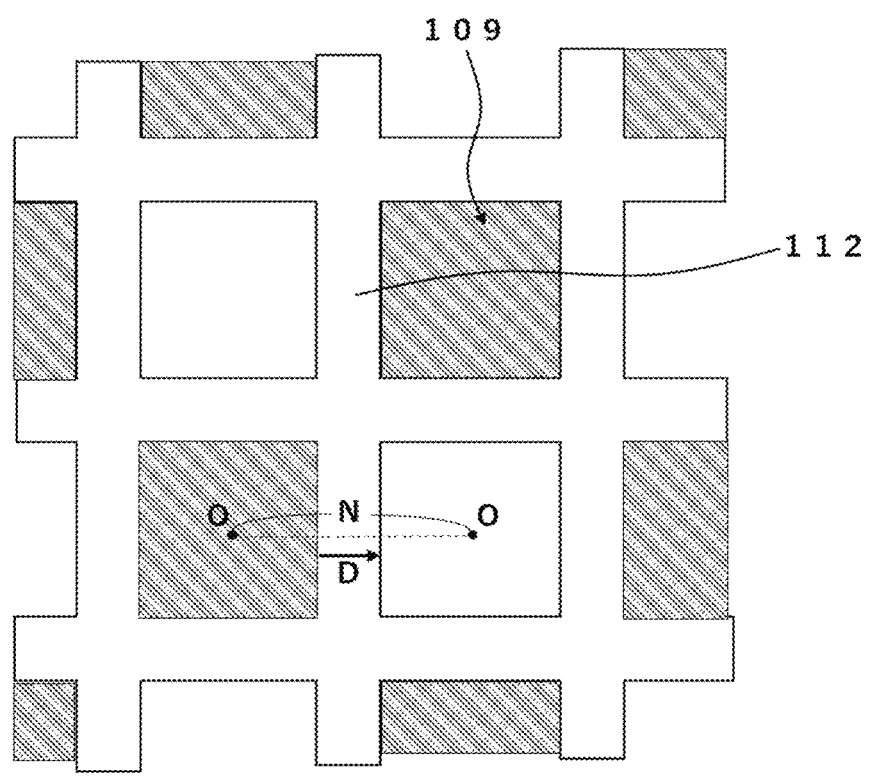
FIG. 6 is a schematic partial enlarged view of the partition walls of the pillar-shaped honeycomb structure when observed in a cross-section perpendicular to the direction in which the cells extend.

From the viewpoint of ensuring strength, the average thickness of the partition walls in the pillar-shaped honeycomb structure is preferably 152 μm or more, more preferably 178 μm or more, and even more preferably 203 μm or more. Further, from the viewpoint of suppressing pressure loss, the average thickness of the partition walls is preferably 305 μm or less, more preferably 279 μm or less, and even more preferably 254 μm or less. FIG. 6 shows a schematic partial enlarged view when the partition walls 112 of the pillar-shaped honeycomb structure 100 are observed in a cross-section perpendicular to the direction in which the cells extend. The thickness of the partition wall refers to a crossing length of a line segment N that crosses the partition wall when the centers of gravity O of adjacent cells are connected by this line segment N in a cross-section orthogonal to the direction in which the cells extend (height direction of pillar-shaped honeycomb structure). The thickness direction D of the partition wall refers to a direction parallel to the line segment N. The average thickness of partition walls refers to the average value of the thicknesses of all partition walls.

In one embodiment, the sealing portions on the first end surface and the second end surface both have an average depth of 2 to 8 mm. When the average depth of the sealing portions is 2 mm or more, the strength of the sealing portions can be ensured. The average depth of the sealing portions is preferably 3 mm or more. Further, by setting the average depth of the sealing portions to 8 mm or less, it is possible to prevent the area of the partition walls that collect particulate matter within the cell from becoming small. The average depth of the sealing portions is preferably 7 mm or less. The depth of the sealing portions in the direction in which the cells extend is measured at arbitrary 20 locations for each end surface, and the average value thereof is taken as the average depth of the sealing portions of each end surface.

There is no particular restriction on the cell density (number of cells per unit cross-sectional area) of the pillar-shaped honeycomb structure, for example, it can be 6 to 2000 cells/square inch (0.9 to 311 cells/cm$^2$), more preferably 50 to 1000 cells/square inch (7.8 to 155 cells/cm$^2$), particularly preferably 100 to 600 cells/square inch (15.5 to 92.0 cells/cm$^2$). Here, the cell density is calculated by dividing the total number of cells (including sealed cells) by the end surface area of one side of the pillar-shaped honeycomb structure excluding the outer peripheral side wall.

It is desirable that the pore diameter distribution of the partition walls be sharp in order to achieve a balance between low pressure loss and collection performance. Specifically, in the volume-based cumulative pore diameter distribution measured by mercury porosimetry, in the partition walls, especially in the portion of the partition walls in the range C, it is preferable that the cumulative 10% pore diameter (D10), the cumulative 50% pore diameter (D50), and the cumulative 90% pore diameter (D90) from the small pore side satisfy the relationship (D90−D10)/D50≤1.2, more preferably satisfy the relationship (D90−D10)/D50≤1.1, and even more preferably satisfy relationship (D90−D10)/D50≤1.0. The lower limit of (D90−D10)/D50 is 0, but from the viewpoint of ease of manufacture, it is normal to satisfy 0.5≤(D90−D10)/D50.

In this specification, D10, D50, and D90 of the partition walls are measured by the mercury porosimetry specified in JIS R1655: 2003 using a mercury porosimeter. The mercury porosimetry is a method in which a sample is immersed in mercury in a vacuum state, and uniform pressure is applied, and mercury is injected into the sample while the pressure is gradually increased. The pore diameter distribution is calculated from the pressure and the volume of mercury intruded into the pores. When the pressure is gradually increased, mercury is intruded into the pores starting from the largest diameter, increasing the cumulative capacity of mercury. Finally, when all the pores are filled with mercury, the cumulative capacity reaches an equilibrium amount. The cumulative capacity at this time is the total pore volume (cm$^3$/g). In addition, the pore diameter at the time when 10% of the total pore volume of mercury is intruded from the small pore side is the cumulative 10% pore diameter (D10), the pore diameter at the time when 50% of the total pore volume of mercury is intruded from the small pore side is the cumulative 50% pore diameter (D50), and the pore diameter at the time when 90% of the total pore volume of mercury is intruded from the small pore side is the cumulative 90% pore diameter (D90).

Six samples (0.3 g) were collected evenly from the partition walls in the above range C of the pillar-shaped honeycomb structure, including the radial center and outer periphery. Each pore diameter distribution is measured to determine D10, D50 and D90, and the average value is taken as the measured value.

It is desirable that the D50 of the partition walls be set within an appropriate range depending on the application. For example, when using a pillar-shaped honeycomb structure as a filter, the D50 of the partition walls, especially the portion of the partition walls in the range C, is preferably 28 μm or less, more preferably 26 μm or less, and even more preferably 24 μm or less. When D50 of the partition walls is within the above range, particulate matter collection efficiency is significantly improved. Further, D50 of the partition walls is preferably 5 μm or more, more preferably 6 μm or more, and even more preferably 7 μm or more. When D50 of the partition walls is within the above range, an increase in pressure loss can be suppressed.

One measure to evaluate the mechanical strength of a pillar-shaped honeycomb structure is isostatic fracture strength. In measuring the isostatic fracture strength of a pillar-shaped honeycomb structure, a test is performed in which the pillar-shaped honeycomb structure is submerged in water in a pressure vessel and isotropic pressure is applied to the pillar-shaped honeycomb structure by gradually increasing the water pressure. The gradual increase in water pressure within the pressure vessel eventually causes destruction of the partition walls and outer peripheral side walls of the pillar-shaped honeycomb structure. The value of pressure (fracture strength) when fracture occurs is the isostatic fracture strength. Isostatic fracture strength is measured based on the automobile standard (JASO M505-87) published by the Society of Automotive Engineers of Japan.

When applying the pillar-shaped honeycomb structure as an exhaust gas filter and/or catalyst carrier for automobiles, the lower limit of isostatic fracture strength is preferably 0.5 MPa or more, more preferably 1.0 MPa or more, and even more preferably 1.5 MPa or more. Although the upper limit of the isostatic fracture strength is not particularly set, it is usually 3.0 MPa or less, and typically 2.5 MPa or less.

When using a pillar-shaped honeycomb structure as a catalyst carrier, the surfaces of the partition walls can be coated with a catalyst depending on the purpose. As to the catalyst, although not limited, mention can be made to an oxidation catalyst (DOC) for oxidizing and burning hydrocarbons (HC) and carbon monoxide (CO) to increase exhaust gas temperature, a PM combustion catalyst that assists in the combustion of PM such as soot, an SCR catalyst and an NSR catalyst to remove nitrogen oxides (NOx), as well as a three-way catalyst that can simultaneously remove hydrocarbons (HC), carbon monoxide (CO), and nitrogen oxides (NOx). The catalyst may contain as appropriate, for example, noble metals (Pt, Pd, Rh, and the like), alkali metals (Li, Na, K, Cs, and the like), alkaline earth metals (Mg, Ca, Ba, Sr, and the like), rare earths (Ce, Sm, Gd, Nd, Y, La, Pr, and the like), transition metals (Mn, Fe, Co, Ni, Cu, Zn, Sc, Ti, Zr, V, Cr, and the like), and the like.

(2. Manufacturing Method)

A method for manufacturing a pillar-shaped honeycomb structure according to an embodiment of the present invention will be exemplified as below. First, a green body is formed by kneading a raw material composition containing a cordierite-forming raw material, a dispersion medium, a pore-forming material, a binder, and further containing one or more sintering aids selected from ceria, zirconia, and titania. Then, the green body is extrusion molded to obtain a pillar-shaped honeycomb formed body comprising an outer peripheral side wall; and a plurality of cells disposed on an inner peripheral side of the outer peripheral side wall, each extending from the first end surface to the second end surface and having an opening on both the first end surface and the second end surface is obtained. Additives such as a dispersant and other ceramic raw materials may be added to the raw material composition as necessary. For extrusion molding, a die having a desired overall shape, cell shape, partition wall thickness, cell density, and the like can be used.

The cordierite-forming raw material is a raw material that becomes cordierite by firing, and can be provided, for example, in the form of a powder. It is desirable that the cordierite-forming raw material has a chemical composition of alumina ($Al_2O_3$) (including aluminum hydroxide that converts to alumina): 30 to 45% by mass, magnesia (MgO): 11 to 17% by mass, and silica ($SiO_2$): 42 to 57% by mass.

From the viewpoint of sharpening the pore diameter distribution, the total added amount of one or more sintering aids selected from ceria, zirconia, and titania is preferably 2 parts by mass or more, more preferably 3 parts by mass or more, and even more preferably 4 parts by mass or more, with respect to 100 parts by mass of the cordierite-forming raw material. From the viewpoint of suppressing a decrease in the melting point of the outer peripheral side wall and the partition walls, the total added amount of one or more sintering aids selected from ceria, zirconia, and titania is preferably 10 parts by mass or less, more preferably 8 parts by mass or less, and even more preferably 6 parts by mass or less, with respect to 100 parts by mass of cordierite-forming raw material.

From the viewpoint of improving the composition uniformity in the partition walls and outer peripheral side walls of the pillar-shaped honeycomb structure, the sintering aid added to the raw material composition preferably has an upper limit of the median diameter (D50) of 10 μm or less, more preferably 8 μm or less, and even more preferably 6 μm or less, in the volume-based cumulative particle diameter distribution determined by a laser diffraction/scattering method. In addition, from the viewpoint of generating internal defects due to agglomeration, the sintering aid in the raw material composition preferably has a lower limit of the median diameter (D50) of 0.1 μm or more, more preferably 0.3 μm or more, and even more preferably 0.5 μm or more, in the volume-based cumulative particle diameter distribution determined by the laser diffraction/scattering method. Therefore, for example, the median diameter (D50) of the sintering aid in the raw material composition is preferably 0.1 to 10 μm, more preferably 0.3 to 8 μm, and even more preferably 0.5 to 6 μm.

Examples of the dispersion medium include water or a mixed solvent of water and an organic solvent such as alcohol, and water is particularly preferably used.

The content of the dispersion medium in the pillar-shaped honeycomb formed body before a drying step is preferably 20 to 110 parts by mass, more preferably 25 to 100 parts by mass, and even more preferably 30 to 90 parts by mass, with respect to 100 parts by mass of the cordierite-forming raw material. When the content of the dispersion medium in the pillar-shaped honeycomb formed body is 20 parts by mass or more with respect to 100 parts by mass of the cordierite-forming raw material, it is easy to obtain the advantage that the quality of the pillar-shaped honeycomb structure is easily stabilized. When the content of the dispersion medium in the pillar-shaped honeycomb formed body is 110 parts by mass or less with respect to 100 parts by mass of the cordierite-forming raw material, the amount of shrinkage during drying becomes small and deformation can be suppressed. In this specification, the content of the dispersion medium in the pillar-shaped honeycomb formed body refers to a value measured by a loss on drying method.

The pore-forming material is not particularly limited as long as it forms pores after firing, and for example, mention can be made to flour, starch, foamed resin, water absorbent resin, silica gel, carbon (for example, graphite), ceramic balloon, polyethylene, polystyrene, polypropylene, nylon, polyester, acrylic resin, phenol, and the like. As the pore-forming material, one type may be used alone, and two or more types may be used in combination. From the viewpoint of increasing the porosity of the pillar-shaped honeycomb structure after firing, the content of the pore-forming material is preferably 3 parts by mass or more, and more preferably 6 parts by mass or more, and even more preferably 9 parts by mass or more, with respect to 100 parts by mass of the cordierite-forming raw material. From the viewpoint of ensuring the strength of the pillar-shaped honeycomb structure after firing, the content of the pore-forming material is preferably 30 parts by mass or less, more preferably 27 parts by mass or less, and even more preferably 24 parts by mass or less, with respect to 100 parts by mass of the cordierite-forming raw material.

As the binder, examples include organic binders such as methylcellulose, hydroxypropoxymethylcellulose, hydroxypropylmethylcellulose, hydroxyethylcellulose, hydroxyethylmethylcellulose, carboxymethylcellulose, and polyvinyl alcohol. Further, from the viewpoint of increasing the strength of the pillar-shaped honeycomb formed body before firing, the content of the binder is preferably 4 parts by mass or more, more preferably 4.5 parts by mass or more, and even more preferably 5 parts by mass or more, with respect to 100 parts by mass of the cordierite-forming raw material. From the viewpoint of suppressing the occurrence of crack due to abnormal heat generation in a firing step, the content of the binder is preferably 9 parts by mass or less, more preferably 8 parts by mass or less, and even more preferably 7 parts by mass or less, with respect to 100 parts by mass of the cordierite-forming raw material. As the binder, one type may be used alone, and two or more types may be used in combination.

As the dispersant, ethylene glycol, dextrin, fatty acid soap, polyether polyol, and the like can be used. As the dispersant, one type may be used alone, and two or more types may be used in combination. The content of the dispersant is preferably 0 to 2 parts by mass with respect to 100 parts by mass of the cordierite-forming raw material.

For drying the pillar-shaped honeycomb formed body, conventionally known drying methods such as hot wind drying, microwave drying, dielectric drying, reduced pressure drying, vacuum drying, and freeze drying can be used. Among these, a drying method that combines hot wind drying with microwave drying or dielectric drying is preferable since the entire pillar-shaped honeycomb formed body can be dried quickly and uniformly.

After drying the pillar-shaped honeycomb formed body, sealing portions are formed on both end surfaces of the pillar-shaped honeycomb formed body. The sealing portions on each of them can be formed by a method of filling the openings of the first cells and the second cells where the sealing portions are to be formed with a slurry for forming sealing portions, and then drying and firing the filled slurry. The slurry for forming sealing portions may contain one or more sintering aids selected from ceria, zirconia, and titania, in addition to the cordierite-forming raw material, the dispersion medium, the pore-forming material, and the binder.

As one example, the slurry for forming sealing portions contains 30 to 60 parts by mass of a dispersion medium, 5 to 20 parts by mass of a pore-forming material, and 0.2 to 2.0 parts by mass of a binder, with respect to 100 parts by mass of the cordierite-forming raw material. In a preferred embodiment, the slurry for forming sealing portions contains 35 to 50 parts by mass of a dispersion medium, 8 to 16 parts by mass of a pore-forming material, and 0.2 to 1.5 parts by mass of a binder, with respect to 100 parts by mass of the cordierite-forming raw material.

It is desirable to adjust the total added amount of one or more sintering aids selected from ceria, zirconia, and titania in the slurry for forming sealing portions according to the total added amount of one or more sintering aids selected from ceria, zirconia, and titania in the raw material composition for obtaining the above-mentioned pillar-shaped honeycomb formed body. Specifically, for the sintering aid in the raw material composition for obtaining the pillar-shaped honeycomb structure, assuming the total added amount with respect to 100 parts by mass of the cordierite-forming raw material is $C_1$ parts by mass, and for the sintering aid in the slurry for forming the sealing portions, assuming the total added amount by mass with respect to 100 parts of the cordierite-forming raw material is $C_2$ parts by mass, it is preferable to satisfy $C_1-C_2 \leq 1$, more preferable to satisfy $C_1-C_2 \leq 0$, and even more preferable to satisfy $C_1-C_2 \leq -1$, from the viewpoint of suppressing the movement of the sintering aid from the partition walls to the sealing portions. However, if $C_1-C_2$ is made too small, the effect of suppressing the movement of the sintering aid from the partition walls to the sealing portions will be saturated, and the melting point of the partition walls tends to decrease, so it is preferable to satisfy $-8 \leq C_1-C_2$, more preferable to satisfy $-6 \leq C_1-C_2$, and even more preferable to satisfy $-4 \leq C_1-C_2$. Therefore, for example, it is preferable to satisfy $-8 \leq C_1-C_2 \leq 1$, more preferable to satisfy $-6 \leq C_1-C_2 \leq 0$, and even more preferable to satisfy $-4 \leq C_1-C_2 \leq -1$.

As long as $C_1$ and $C_2$ satisfy the above relationship, there is no particular limitation to $C_2$ itself, but it is normal that $1 \leq C_2 \leq 10$ is satisfied, and typically $1.5 \leq C_2 \leq 8$ is satisfied, more typically $2.0 \leq C_2 \leq 6$ is satisfied.

From the viewpoint of uniformity of composition, the upper limit of the median diameter (D50) of the sintering aid in the slurry for forming sealing portions is preferably 10 μm or less, more preferably 8 μm or less, and even more preferably 6 μm or less, in the volume-based cumulative particle diameter distribution determined by the laser diffraction/scattering method. In addition, from the viewpoint of not causing internal defects due to aggregation, the lower limit of the median diameter (D50) of the sintering aid in the slurry for forming sealing portions is preferably 0.1 μm or more, more preferably 0.3 μm or more, and even more preferably 0.5 μm or more, in the volume-based cumulative particle diameter distribution determined by the laser diffraction/scattering method. Therefore, for example, the median diameter (D50) of the sintering aid in the slurry for forming sealing portions is preferably 0.1 to 10 μm, more preferably 0.3 to 8 μm, and even more preferably 0.5 to 6 μm.

Examples of the dispersion medium include water or a mixed solvent of water and an organic solvent such as alcohol, and water is particularly preferably used.

The pore-forming material is not particularly limited as long as it forms pores after firing, and for example, mention can be made to flour, starch, foamed resin, water absorbent resin, silica gel, carbon (for example, graphite), ceramic balloon, polyethylene, polystyrene, polypropylene, nylon, polyester, acrylic resin, phenol, and the like. As the pore-forming material, one type may be used alone, and two or more types may be used in combination.

As the binder, examples include organic binders such as methylcellulose, hydroxypropoxymethylcellulose, hydroxypropylmethylcellulose, hydroxyethylcellulose, hydroxyethylmethylcellulose, carboxymethylcellulose, and polyvinyl alcohol. As the binder, one type may be used alone, and two or more types may be used in combination.

The slurry for forming sealing portions may contain a dispersant as appropriate. The dispersant can be contained, for example, in an amount of 0.1 to 3 parts by mass, preferably 0.2 to 2 parts by mass, with respect to 100 parts by mass of the cordierite-forming raw material. Examples of the dispersant include ethylene glycol, dextrin, fatty acid soap, and polyalcohol, and the like. As the dispersant, one type may be used alone, and two or more types may be used in combination.

Figure 7:
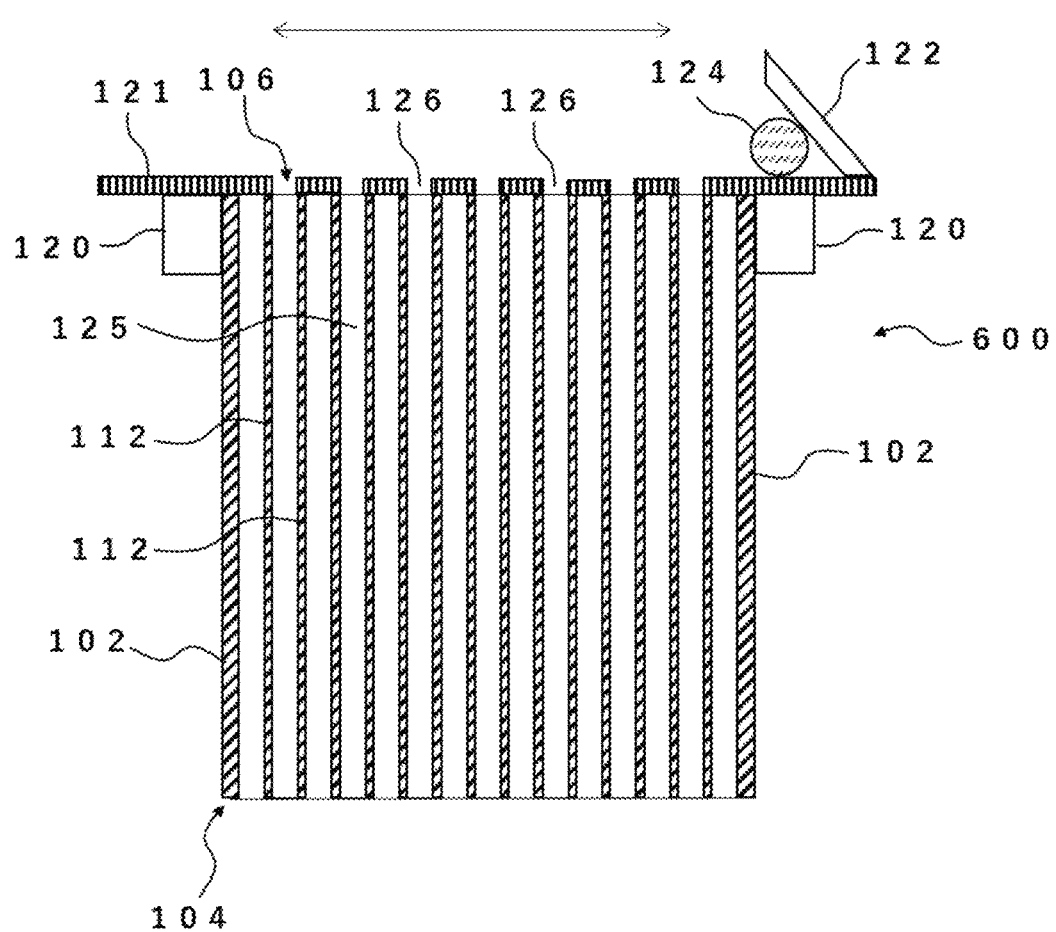
FIG. 7 is an explanatory diagram schematically showing an example of a method for forming sealing portions using a squeegee method.

Filling the openings of the cells with the slurry for forming sealing portions can be carried out by, for example, the following "squeegee method". As shown in FIG. 7, a film 121 is attached to the upper end surface (here, the second end surface 106 in the figure) of a dried pillar-shaped honeycomb formed body 600 which is fixed with a chuck 120, and a plurality of holes 126 are formed in the film 121 by irradiating the film 121 with a laser at positions corresponding to the arrangement condition of the sealing portions (for example, a "checkered pattern" or the like).

Thereafter, the slurry for forming sealing portions 124 is applied on the film 121, and a squeegee 122 is moved along the film 121 in the direction of the arrow in FIG. 7. As a result, the cells 125 opening at positions corresponding to the holes 126 of the film 121 are filled with a certain amount of the slurry for forming sealing portions 124.

The depth of the sealing portions can be changed depending on the number of times the squeegee 122 is moved, the contact angle between the squeegee 122 and the film 121, the pressure of the squeegee 122 against the film 121, and the viscosity of the slurry for forming sealing portions 124, and the like.

After filling with the slurry for forming sealing portions 124, the film 121 is peeled off and the entire pillar-shaped honeycomb formed body 600 is dried. As a result, the slurry for forming sealing portions 124 filled in the cells 125 is dried, and sealing portions before firing are formed. Drying can be carried out, for example, at a drying temperature of 100 to 230° C. for about 60 to 150 seconds. After drying, the sealing portions protrude from the end surface of the pillar-shaped honeycomb formed body by the thickness of the film, so they can be scraped off if necessary.

The material of the film is not particularly limited, but polypropylene (PP), polyethylene terephthalate (PET), polyimide, or Teflon (registered trademark) are preferable because they can be easily thermally processed to form holes. Further, the film preferably has an adhesive layer, and the material of the adhesive layer may be acrylic resin, rubber-based (for example, rubber whose main component is natural rubber or synthetic rubber), or silicon-based resin. preferable. As the film, for example, an adhesive film having a thickness of 20 to 50 µm can be suitably used.

In addition to the above-mentioned "squeegee method", a "press-in method" can be cited as a method for filling the openings of cells with the slurry for forming sealing portions. The "press-in method" is a method of immersing the end surface of the pillar-shaped honeycomb formed body with a film attached and holes provided in a liquid tank containing the slurry for forming sealing portions, and filling the cells with the slurry for forming sealing portions. In this case, the depth of the sealing portions can be changed depending on the depth at which the pillar-shaped honeycomb formed body is immersed in the slurry for forming the sealing portions.

The pillar-shaped honeycomb formed body filled with the slurry for forming sealing portions is then subjected to a degreasing process and a firing process, thereby manufacturing a pillar-shaped honeycomb structure. The combustion temperature of the binder is about 200° C., and the combustion temperature of the pore-forming material is about 300 to 1000° C. Therefore, the degreasing step may be carried out by heating the honeycomb formed body to a temperature in the range of about 200 to 1000° C. The heating time is not particularly limited, but is usually about 10 to 100 hours. The honeycomb formed body after the degreasing process is called a calcined body. The firing step can be carried out, for example, by heating the calcined body to 1300 to 1450° C. and holding it for 3 to 24 hours, although it depends on the material composition of the pillar-shaped honeycomb structure.

EXAMPLES

Hereinafter, Examples will be illustrated for better understanding of the present invention and its advantages. However, the present invention is not limited to the Examples.

Comparative Example 1-1

(1) Preparation of Pillar-Shaped Honeycomb Formed Body

A raw material composition obtained by adding 80 parts by mass of a dispersion medium, 25 parts by mass of a pore-forming material, 5 parts by mass of a binder, and 1 part by mass of a dispersant to 100 parts by mass of a cordierite-forming raw material was kneaded to prepare a green body. As the cordierite-forming raw material, alumina, aluminum hydroxide, kaolin, talc, and silica were used. Water was used as the dispersion medium, a water absorbent resin and silica gel were used as the pore-forming material, methyl cellulose was used as the binder, and ethylene glycol was used as the dispersant.

This green body was put into an extrusion molding machine and extrusion molded through a die of a predetermined shape to obtain a cylindrical pillar-shaped honeycomb formed body. After dielectrically drying and hot wind drying the obtained pillar-shaped honeycomb formed body, both end surfaces were cut to a predetermined size and further hot wind drying was performed at 70° C. for 2 hours.

(2) Formation of Sealing Portions 40 parts by mass of a dispersion medium, 10 parts by mass of a pore-forming material, 2 parts by mass of a binder, and 1 part by mass of a dispersant were added to 100 parts by mass of a cordierite-forming raw material and they were kneaded to prepare a slurry for forming sealing portions. As the cordierite-forming raw material, alumina, aluminum hydroxide, kaolin, talc, and silica were used. Water was used as the dispersion medium, foamed resin was used as the pore-forming material, methyl cellulose was used as the binder, and ethylene glycol was used as the dispersant. Using the above-mentioned "squeegee method", both end surfaces were filled with this slurry for forming sealing portions such that the first cells and the second cells were alternately arranged adjacent to each other. Thereafter, drying was performed at 180° C. for 200 seconds in an air atmosphere.

(3) Firing

Next, a pillar-shaped honeycomb structure having sealing portions was obtained by heating and degreasing at about 200° C. in an air atmosphere, and then firing at 1400° C. for 10 hours in an air atmosphere. A number of pillar-shaped honeycomb structures required for the following tests were manufactured.

(4) Specifications of Pillar-Shaped Honeycomb Structure

The specifications of the obtained pillar-shaped honeycomb structure were as follows.

Overall shape: cylindrical with diameter 132 mm×height 152 mm

Cell shape in cross-section perpendicular to flow path direction of cells: square Cell density (number of cells per unit cross-sectional area): 300 cells/square inch (47 cells/cm$^2$)

Average thickness of partition walls: 8.5 mil (216 µm) (nominal value based on the specifications of the die)

Average depth of sealing portions: 5 mm

The outer peripheral side walls, the partition walls, and the sealing portions of the pillar-shaped honeycomb structure were analyzed with X-ray analysis measurement in the range of 2θ=8 to 100° by X-ray diffraction using an X'pert PRO device manufactured by PANalytical with Kα rays of Cu. The cordierite crystal phase ratio was determined by analysis using the Rietveld analysis program RIETAN and found to be 75 to 94% by mass.

Comparative Examples 1-2 to 1-6, Examples 1-1 to 1-9

Three types of sintering aids were prepared: ceria, zirconia, and titania. These were in a powder form, and the results of determining the median diameter (D50) in the volume-based cumulative particle diameter distribution by the laser diffraction/scattering method are shown below.
Ceria: 1 μm
Zirconia: 1 μm
Titania: 1 μm Pillar-shaped honeycomb structures were obtained under the same manufacturing conditions as Comparative Example 1-1, except that the added amount $C_1$ (parts by mass) of the sintering aid with respect to 100 parts by mass of the cordierite-forming raw material in the raw material composition for the honeycomb formed body, and the added amount $C_2$ (parts by mass) of the sintering aid with respect to 100 parts by mass of the cordierite-forming raw material in the slurry for forming sealing portions were set according to the conditions listed in Table 1. A number of pillar-shaped honeycomb structures required for the following tests were manufactured.

Comparative Example 2-1

(1) Preparation of Pillar-Shaped Honeycomb Formed Body

A raw material composition obtained by adding 80 parts by mass of a dispersion medium, 25 parts by mass of a pore-forming material, 5 parts by mass of a binder, and 1 part by mass of a dispersant to 100 parts by mass of a cordierite-forming raw material was kneaded to prepare a green body. As the cordierite-forming raw material, alumina, aluminum hydroxide, kaolin, talc, and silica were used. Water was used as the dispersion medium, water absorbent resin and silica gel were used as the pore-forming material, methyl cellulose was used as the binder, and ethylene glycol was used as the dispersant.

This green body was put into an extrusion molding machine and extruded through a die of a predetermined shape to obtain a cylindrical pillar-shaped honeycomb formed body. After dielectrically drying and hot wind drying the obtained pillar-shaped honeycomb formed body, both end surfaces were cut to a predetermined size and further hot wind drying was performed at 70° C. for 2 hours.

(2) Formation of Sealing Portions 40 parts by mass of a dispersion medium, 10 parts by mass of a pore-forming material, 2 parts by mass of a binder, and 1 part by mass of a dispersant were added to 100 parts by mass of a cordierite-forming raw material and they were kneaded to prepare a slurry for forming sealing portions. As the cordierite-forming raw material, alumina, aluminum hydroxide, kaolin, talc, and silica were used. Water was used as the dispersion medium, foamed resin was used as the pore-forming material, methyl cellulose was used as the binder, and ethylene glycol was used as the dispersant. Using the above-mentioned "squeegee method", both end surfaces were filled with this slurry for forming sealing portions such that the first cells and the second cells were alternately arranged adjacent to each other.

(3) Firing

Thereafter, drying was performed at 180° C. for 200 seconds in an air atmosphere. Next, a pillar-shaped honeycomb structure having sealing portions was obtained by heating and degreasing at about 200° C. in an air atmosphere, and then firing at 1400° C. for 10 hours in an air atmosphere. A number of pillar-shaped honeycomb structures required for the following tests were manufactured.

(4) Specifications of Pillar-Shaped Honeycomb Structure

The specifications of the obtained pillar-shaped honeycomb structure were as follows.
Overall shape: cylindrical with diameter 132 mm×height 152 mm
Cell shape in cross-section perpendicular to flow path direction of cells: square
Cell density (number of cells per unit cross-sectional area): 340 cells/square inch (53 cells/cm$^2$)
Average thickness of partition walls: 11 mil (279 μm) (nominal value based on the specifications of the die)
Average depth of sealing portions: 5 mm The outer peripheral side walls, the partition walls, and the sealing portions of the pillar-shaped honeycomb structure were analyzed with X-ray analysis measurement in the range of 2θ=8 to 100° by X-ray diffraction using an X'pert PRO device manufactured by PANalytical with Kα rays of Cu. The cordierite crystal phase ratio was determined by analysis using the Rietveld analysis program RIETAN and found to be 75 to 94% by mass.

Comparative Examples 2-2 to 2-6, Examples 2-1 to 2-9

Three types of sintering aids were prepared: ceria, zirconia, and titania. These were in a powder form, and the results of determining the median diameter (D50) in the volume-based cumulative particle diameter distribution by the laser diffraction/scattering method are shown below.
Ceria: 1 μm
Zirconia: 1 μm
Titania: 1 μm Pillar-shaped honeycomb structures were obtained under the same manufacturing conditions as Comparative Example 2-1, except that the added amount $C_1$ (parts by mass) of the sintering aid with respect to 100 parts by mass of the cordierite-forming raw material in the raw material composition for the honeycomb formed body, and the added amount $C_2$ (parts by mass) of the sintering aid with respect to 100 parts by mass of the cordierite-forming raw material in the slurry for forming sealing portions were set according to the conditions listed in Table 2. A number of pillar-shaped honeycomb structures required for the following tests were manufactured.

<Characteristics Evaluation>

Various characteristic evaluations were performed on each pillar-shaped honeycomb structure obtained above.

(1. Porosity)

The average porosity $P_1$ (%) of the partition walls in the above-mentioned range A and range B (in the vicinity of the sealing portions) of the pillar-shaped honeycomb structure, and of the average porosity $P_2$ (%) of the partition walls in the above-mentioned range C (locations away from the sealing portions) were determined according to the method described above. Based on the measurement results, $P_1-P_2$ was calculated. The results are shown in Tables 1 and 2.

(2. SEM-EDS Analysis)

$S_1$ (%), which is the average value of the total content ratio of the sintering aid in the portion of the partition walls in the above-mentioned range A and range B (in the vicinity of the sealing portions) of the pillar-shaped honeycomb structure; $S_2$ (%), which is the average value of the total content ratio of the sintering aid in the portion of the partition walls in the above-mentioned range C (locations away from the sealing portions); and $S_3$ (%), which is the average value of the total content ratio of the sintering aid in the sealing portions were determined according to the method described above. The device used for the SEM-EDS analysis was model S-3400N manufactured by Hitachi High-Tech Corporation. The results are shown in Tables 1 and 2.

(3. Measurement of Pore Diameter Distribution)

The pore diameter distribution (D10, D50, and D90) of the partition walls of the pillar-shaped honeycomb structure was measured by mercury porosimetry according to the method described above. Based on the measurement results, (D90–D10)/D50 was calculated. Furthermore, based on the results of the SEM-EDS analysis, $(S_2-S_1)/D50\times100$ was calculated. The results are shown in Tables 1 and 2.

(4. Measurement of Isostatic Fracture Strength)

The isostatic fracture strength of the pillar-shaped honeycomb structure was measured based on the automobile standard (JASO M505-87) published by the Society of Automotive Engineers of Japan. The results are shown in Tables 1 and 2.

TABLE 1

| | Sintering aid | | | | Porosity (%) | | |
| --- | --- | --- | --- | --- | --- | --- | --- |
| | Type | Added amount $C_1$ for honeycomb (parts by mass) | Added amount $C_2$ for sealing portions (parts by mass) | $C_1 - C_2$ | Range C ($P_2$) | Range A + B ($P_1$) | $P_1 - P_2$ |
| Comparative Example 1-1 | — | 0 | 0 | 0 | 65 | 68 | 3 |
| Comparative Example 1-2 | Celia | 2 | 0 | 2 | 65 | 74 | 9 |
| Comparative Example 1-3 | Celia | 4 | 0 | 4 | 65 | 74 | 9 |
| Comparative Example 1-4 | Celia | 4 | 2 | 2 | 65 | 74 | 9 |
| Comparative Example 1-5 | Celia | 6 | 3 | 3 | 65 | 74 | 9 |
| Comparative Example 1-6 | Zirconia | 2 | 0 | 2 | 65 | 74 | 9 |
| Comparative Example 1-7 | Titania | 2 | 0 | 2 | 65 | 74 | 9 |
| Example 1-1 | Celia | 4 | 3 | 1 | 65 | 72 | 7 |
| Example 1-2 | Celia | 2 | 2 | 0 | 65 | 70 | 5 |
| Example 1-3 | Celia | 4 | 4 | 0 | 65 | 70 | 5 |
| Example 1-4 | Celia | 4 | 5 | −1 | 65 | 69 | 4 |
| Example 1-5 | Celia | 4 | 6 | −2 | 65 | 68 | 3 |
| Example 1-6 | Celia | 4 | 8 | −4 | 65 | 68 | 3 |
| Example 1-7 | Celia | 6 | 8 | −2 | 65 | 68 | 3 |
| Example 1-8 | Zirconia | 4 | 6 | −2 | 65 | 68 | 3 |
| Example 1-9 | Titania | 4 | 6 | −2 | 65 | 68 | 3 |

| | Sintering aid content ratio (%) based on SEM-EDS analysis | | | | Pore diameter distribution | | | Isostatic fracture strength (MPa) |
| --- | --- | --- | --- | --- | --- | --- | --- | --- |
| | Range C ($S_2$) | Range A + B ($S_1$) | Sealing portions ($S_3$) | $S_2 - S_1$ | D50 (μm) | (D90 − D10)/D50 | $(S_2 - S_1)/$ D50 × 100 | |
| Comparative Example 1-1 | 0 | 0 | 0 | 0 | 23 | 1.7 | — | 1.96 |
| Comparative Example 1-2 | 2.1 | 0.3 | 1.3 | 1.8 | 23 | 1.2 | 7.8 | 1.06 |
| Comparative Example 1-3 | 4.3 | 1.2 | 1.8 | 3.1 | 23 | 1.0 | 13.5 | 1.10 |
| Comparative Example 1-4 | 4.3 | 1.8 | 2.8 | 2.5 | 23 | 1.0 | 10.9 | 0.97 |
| Comparative Example 1-5 | 6.4 | 3.2 | 5.0 | 3.2 | 23 | 0.9 | 13.9 | 1.11 |
| Comparative Example 1-6 | 2.3 | 0.8 | 1.0 | 1.5 | 23 | 1.2 | 6.5 | 0.99 |
| Comparative Example 1-7 | 2.4 | 0.9 | 1.1 | 1.5 | 23 | 1.2 | 6.5 | 1.05 |
| Example 1-1 | 4.3 | 3.1 | 4.0 | 1.2 | 23 | 1.0 | 5.2 | 1.25 |
| Example 1-2 | 2.1 | 1.2 | 2.2 | 0.9 | 23 | 1.2 | 3.9 | 1.49 |
| Example 1-3 | 4.3 | 3.4 | 4.6 | 0.9 | 23 | 1.0 | 3.9 | 1.55 |
| Example 1-4 | 4.3 | 3.8 | 5.3 | 0.5 | 23 | 1.0 | 2.2 | 1.63 |
| Example 1-5 | 4.3 | 4.3 | 6.5 | 0.0 | 23 | 1.0 | 0.0 | 1.85 |
| Example 1-6 | 4.3 | 4.4 | 8.6 | −0.1 | 23 | 1.0 | −0.4 | 1.87 |
| Example 1-7 | 6.4 | 6.3 | 8.7 | 0.1 | 23 | 0.9 | 0.4 | 1.80 |
| Example 1-8 | 4.6 | 4.5 | 6.9 | 0.1 | 23 | 1.0 | 0.4 | 1.79 |
| Example 1-9 | 4.8 | 4.8 | 6.8 | 0.0 | 23 | 1.0 | 0.0 | 1.83 |

TABLE 2

| | Sintering aid | | | | Porosity (%) | | |
|---|---|---|---|---|---|---|---|
| | Type | Added amount $C_1$ for honeycomb (parts by mass) | Added amount $C_2$ for sealing portions (parts by mass) | $C_1 - C_2$ | Range C ($P_2$) | Range A + B ($P_1$) | $P_1 - P_2$ |
| Comparative Example 2-1 | — | 0 | 0 | 0 | 58 | 60 | 2 |
| Comparative Example 2-2 | Celia | 2 | 0 | 2 | 58 | 67 | 9 |
| Comparative Example 2-3 | Celia | 4 | 0 | 4 | 58 | 67 | 9 |
| Comparative Example 2-4 | Celia | 4 | 2 | 2 | 58 | 67 | 9 |
| Comparative Example 2-5 | Celia | 6 | 3 | 3 | 58 | 67 | 9 |
| Comparative Example 2-6 | Zirconia | 2 | 0 | 2 | 58 | 67 | 9 |
| Comparative Example 2-7 | Titania | 2 | 0 | 2 | 58 | 67 | 9 |
| Example 2-1 | Celia | 4 | 3 | 1 | 58 | 65 | 7 |
| Example 2-2 | Celia | 2 | 2 | 0 | 58 | 63 | 5 |
| Example 2-3 | Celia | 4 | 4 | 0 | 58 | 63 | 5 |
| Example 2-4 | Celia | 4 | 5 | −1 | 58 | 62 | 4 |
| Example 2-5 | Celia | 4 | 6 | −2 | 58 | 60 | 2 |
| Example 2-6 | Celia | 4 | 8 | −4 | 58 | 60 | 2 |
| Example 2-7 | Celia | 6 | 8 | −2 | 58 | 60 | 2 |
| Example 2-8 | Zirconia | 4 | 6 | −2 | 58 | 60 | 2 |
| Example 2-9 | Titania | 4 | 6 | −2 | 58 | 60 | 2 |

| | Sintering aid content ratio (%) based on SEM-EDS analysis | | | | Pore diameter distribution | | | Isostatic fracture strength (MPa) |
|---|---|---|---|---|---|---|---|---|
| | Range C ($S_2$) | Range A + B ($S_1$) | Sealing portions ($S_3$) | $S_2 - S_1$ | D50 (μm) | (D90 − D10)/D50 | $(S_2 - S_1)/$ D50 × 100 | |
| Comparative Example 2-1 | 0 | 0 | 0 | 0 | 18 | 1.6 | — | 3.40 |
| Comparative Example 2-2 | 2.1 | 0.6 | 0.9 | 1.5 | 18 | 1.1 | 8.3 | 1.89 |
| Comparative Example 2-3 | 4.3 | 1.3 | 2.1 | 3.0 | 18 | 0.9 | 16.7 | 1.98 |
| Comparative Example 2-4 | 4.3 | 2.1 | 2.7 | 2.2 | 18 | 0.9 | 12.2 | 2.02 |
| Comparative Example 2-5 | 6.4 | 3.5 | 4.6 | 2.9 | 18 | 0.8 | 16.1 | 1.95 |
| Comparative Example 2-6 | 2.3 | 0.9 | 1.2 | 1.4 | 18 | 1.1 | 7.8 | 2.00 |
| Comparative Example 2-7 | 2.4 | 1.0 | 1.3 | 1.4 | 18 | 1.1 | 7.8 | 1.94 |
| Example 2-1 | 4.3 | 3.3 | 3.9 | 1.0 | 18 | 0.9 | 5.6 | 2.31 |
| Example 2-2 | 2.1 | 1.5 | 1.9 | 0.6 | 18 | 1.1 | 3.3 | 2.86 |
| Example 2-3 | 4.3 | 3.7 | 4.3 | 0.6 | 18 | 0.9 | 3.3 | 2.78 |
| Example 2-4 | 4.3 | 3.9 | 5.1 | 0.4 | 18 | 0.9 | 2.2 | 3.19 |
| Example 2-5 | 4.3 | 4.6 | 6.3 | −0.3 | 18 | 0.9 | −1.7 | 3.38 |
| Example 2-6 | 4.3 | 4.5 | 8.5 | −0.2 | 18 | 0.9 | −1.1 | 3.44 |
| Example 2-7 | 6.4 | 6.4 | 8.3 | 0.0 | 18 | 0.8 | 0.0 | 3.42 |
| Example 2-8 | 4.6 | 4.6 | 6.7 | 0.0 | 18 | 0.9 | 0.0 | 3.28 |
| Example 2-9 | 4.8 | 5.1 | 6.4 | −0.3 | 18 | 0.9 | −1.7 | 3.31 |

(5. Discussion)

Comparative Examples 1-1 and 2-1, in which no predetermined sintering aid was added, had excellent isostatic fracture strength, but had a broad pore diameter distribution. On the other hand, in Comparative Examples 1-2 to 1-7 and 2-2 to 2-7, in which a predetermined sintering aid was added, the pore diameter distribution became sharp. However, in these Comparative Examples, the manufacturing conditions $C_1 - C_2$ were inappropriate, so the average porosity $P_1$ of the portion of the partition walls in the vicinity of the sealing portions became large, and $-4 \leq P_1 - P_2 \leq 7$ was not satisfied. As a result, the isostatic fracture strength decreased significantly.

On the other hand, in Examples 1-1 to 1-9 and Examples 2-1 to 2-9, the parts constituting the partition walls and outer peripheral side wall of the pillar-shaped honeycomb structure contained a predetermined sintering aid, and $-4 \leq P_1 - P_2 \leq 7$ was satisfied. Therefore, it was possible to suppress a decrease in isostatic fracture strength while sharpening the pore diameter distribution. Furthermore, it can be seen that by optimizing $P_1 - P_2$, an isostatic fracture strength comparable to that of the Comparative Examples before adding a predetermined sintering aid (Comparative Examples 1-1 and 2-1) can be obtained.

DESCRIPTION OF REFERENCE NUMERALS

100: Pillar-shaped honeycomb structure
102: Outer peripheral side wall
104: First end surface
106: Second end surface
108: First cell
109: Sealing portion
110: Second cell
112: Partition wall
112a: Surface
112b: Surface
112c: Surface
120: Chuck
121: Film
122: Squeegee
124: Slurry for forming sealing portions
125: Cell
126: Hole
600: Pillar-shaped honeycomb formed body

The invention claimed is:

1. A pillar-shaped honeycomb structure, comprising an outer peripheral side wall; a plurality of first cells disposed on an inner peripheral side of the outer peripheral side wall, each extending from a first end surface to a second end surface, having an opening on the first end surface and having a sealing portion on the second end surface; and a plurality of second cells disposed on the inner peripheral side of the outer peripheral side wall, each extending from the first end surface to the second end surface, having a sealing portion on the first end surface, and having an opening on the second end surface; the first cells and the second cells being arranged alternately adjacent to each other with partition walls interposed therebetween;
wherein the outer peripheral side wall, the partition walls, and the sealing portions are fired, and comprise cordierite as a main component and one or more sintering aids selected from ceria, zirconia, and titania;
wherein in the partition walls, assuming an average porosity of a portion in a range A from a deepest part of the sealing portions of the second end surface in the direction in which the first cells extend to the second end surface, and a portion in a range B from a deepest part of the sealing portions of the first end surface in the direction in which the second cells extend to the first end surface is $P_1$ (%); and
in the partition walls, assuming an average porosity of a portion in a range C from the deepest part of the sealing portions of the second end surface in the direction in which the first cells extend to the deepest part of the sealing portions of the first end surface in the direction in which the second cells extend is $P_2$ (%), $-4 \leq P_1 - P_2 \leq 7$ is satisfied.

2. The pillar-shaped honeycomb structure according to claim 1, wherein $-2 \leq P_1 - P_2 \leq 5$ is satisfied.

3. The pillar-shaped honeycomb structure according to claim 1, wherein $55 \leq P_2 \leq 70$ is satisfied.

4. The pillar-shaped honeycomb structure according to claim 1, wherein in the partition walls, assuming an average value of a total content of the one or more sintering aids selected from ceria, zirconia, and titania in the portion in the range A and the portion in the range B is $S_1$ (%), and in the partition walls, assuming an average value of a total content of the one or more sintering aids selected from ceria, zirconia, and titania in the range C is $S_2$ (%), and assuming a cumulative 50% pore diameter of the partition walls in a volume-based cumulative pore diameter distribution measured by a mercury porosimetry is D50 (μm), $(S_2-S_1)/D50 \times 100 \leq 6$ is satisfied.

5. The pillar-shaped honeycomb structure according to claim 1, wherein in the partition walls of the portion in the range C, a cumulative 10% pore diameter (D10), a cumulative 50% pore diameter (D50), and a cumulative 90% pore diameter (D90) from the small pore side in a volume-based cumulative pore diameter distribution measured by a mercury porosimetry satisfy a relationship $(D90-D10)/D50 \leq 1.2$.

6. A method for manufacturing a pillar-shaped honeycomb structure, the pillar-shaped honeycomb structure comprising an outer peripheral side wall; a plurality of first cells disposed on an inner peripheral side of the outer peripheral side wall, each extending from a first end surface to a second end surface, having an opening on the first end surface and having a sealing portion on the second end surface; and a plurality of second cells disposed on the inner peripheral side of the outer peripheral side wall, each extending from the first end surface to the second end surface, having a sealing portion on the first end surface, and having an opening on the second end surface; the first cells and the second cells being arranged alternately adjacent to each other with partition walls interposed therebetween; the method comprising:
kneading a raw material composition containing a cordierite-forming raw material, a dispersion medium, a pore-forming material, a binder, and further containing one or more sintering aids selected from ceria, zirconia, and titania to form a green body, and then extrusion molding the green body to obtain a pillar-shaped honeycomb formed body comprising an outer peripheral side wall; and a plurality of cells disposed on an inner peripheral side of the outer peripheral side wall, each extending from the first end surface to the second end surface and having an opening on both the first end surface and the second end surface;
drying the pillar-shaped honeycomb formed body, and then filling the openings on the first end surface and the second end surface where the sealing portions are to be formed with a slurry for forming the sealing portions, the slurry for forming the sealing portions containing a cordierite-forming raw material, a dispersion medium, a pore-forming material, a binder, and further containing one or more sintering aids selected from ceria, zirconia, and titania; and
firing the pillar-shaped honeycomb formed body filled with the slurry for forming the sealing portions;
wherein for the sintering aid in the raw material composition, assuming a total added amount with respect to 100 parts by mass of the cordierite-forming raw material is $C_1$ parts by mass, and for the sintering aid in the slurry for forming the sealing portions, assuming a total added amount with respect to 100 parts by mass of the cordierite-forming raw material is $C_2$ parts by mass, $-8 \leq C_1 - C_2 \leq 1$ is satisfied.

7. The method according to claim 6, wherein $-6 \leq C_1 - C_2 \leq 0$ is satisfied.

8. The method according to claim 6, wherein $1 \leq C_2 \leq 10$ is satisfied.

9. The method according to claim 6, wherein both the sintering aid in the raw material composition and the sintering aid in the slurry for forming the sealing portions have a median diameter (D50) in a volume-based cumulative particle diameter distribution determined by a laser diffraction/scattering method of 0.1 to 10 μm.

* * * * *